US008592698B2

(12) United States Patent
Hung et al.

(10) Patent No.: US 8,592,698 B2
(45) Date of Patent: *Nov. 26, 2013

(54) CAPACITIVE TOUCH SYSTEM AND DATA TRANSMISSION METHOD IN A CAPACITIVE TOUCH SYSTEM

(75) Inventors: Tse-Lun Hung, Taipei (TW); Jung-Shou Huang, Taichung County (TW); Chang-Hsin Chen, Shalu Town, Taichung County (TW)

(73) Assignee: Elan Microelectronics Corporation, Hsinchu (TW)

( * ) Notice: Subject to any disclaimer, the term of this patent is extended or adjusted under 35 U.S.C. 154(b) by 969 days.

This patent is subject to a terminal disclaimer.

(21) Appl. No.: 12/385,098

(22) Filed: Mar. 31, 2009

(65) Prior Publication Data
US 2009/0250269 A1    Oct. 8, 2009

(30) Foreign Application Priority Data

Apr. 2, 2008    (TW) .............................. 97112060 A

(51) Int. Cl.
*G06F 3/044*    (2006.01)
*G06F 3/041*    (2006.01)

(52) U.S. Cl.
USPC .................. 178/18.06; 345/173; 345/178

(58) Field of Classification Search
USPC ................. 345/13–27, 82–104, 156–179; 178/18.01–18.06, 19.01–19.06; 73/78, 73/304 C, 104; 382/182
See application file for complete search history.

(56) References Cited

U.S. PATENT DOCUMENTS

| | | | | |
|---|---|---|---|---|
| 4,733,222 A * | 3/1988 | Evans | ............................. | 341/33 |
| 5,136,282 A * | 8/1992 | Inaba et al. | ..................... | 345/97 |
| 5,392,058 A * | 2/1995 | Tagawa | ........................ | 345/104 |
| 6,357,302 B1 * | 3/2002 | Knapp | ..................... | 73/862.626 |
| 6,370,965 B1 * | 4/2002 | Knapp | ..................... | 73/862.046 |
| 7,436,395 B2 * | 10/2008 | Chiu et al. | ..................... | 345/173 |
| 8,022,940 B2 * | 9/2011 | Hung et al. | ................... | 345/173 |
| 8,040,321 B2 * | 10/2011 | Peng et al. | ..................... | 345/169 |
| 8,125,465 B2 * | 2/2012 | Lin et al. | ...................... | 345/174 |
| 8,195,844 B2 * | 6/2012 | Fulton et al. | .................... | 710/20 |
| 8,358,285 B2 * | 1/2013 | Leung et al. | ................... | 345/174 |
| 8,378,608 B2 * | 2/2013 | Robertson | ..................... | 318/438 |
| 8,405,617 B2 * | 3/2013 | Wilson et al. | ................. | 345/173 |
| 2001/0022565 A1 * | 9/2001 | Kimura | ........................... | 345/82 |
| 2003/0164820 A1 * | 9/2003 | Kent | ............................. | 345/177 |
| 2005/0179672 A1 * | 8/2005 | Chiu et al. | ..................... | 345/173 |
| 2006/0092115 A1 * | 5/2006 | Matono et al. | .................. | 345/90 |
| 2006/0288787 A1 * | 12/2006 | Mistry et al. | .................... | 73/660 |
| 2008/0007534 A1 * | 1/2008 | Peng et al. | ..................... | 345/173 |
| 2008/0042992 A1 * | 2/2008 | Kim | .............................. | 345/173 |
| 2008/0158177 A1 * | 7/2008 | Wilson et al. | ................. | 345/173 |
| 2008/0162835 A1 * | 7/2008 | Wilson et al. | ................. | 711/155 |
| 2008/0162967 A1 * | 7/2008 | Wilson et al. | ................. | 713/322 |
| 2008/0236902 A1 * | 10/2008 | Imaizumi | .................. | 178/18.01 |
| 2009/0058818 A1 * | 3/2009 | Chang et al. | ................... | 345/173 |

(Continued)

*Primary Examiner* — Prabodh M Dharia
(74) *Attorney, Agent, or Firm* — Rosenberg, Klein & Lee

(57) ABSTRACT

A capacitive touch system uses at least two first integrated circuits to simultaneously scan a touch panel, each of the first integrated circuits only for scanning a portion of the touch panel to retrieve the sensed data from its responsible traces. Therefore, the capacitive touch system can maintain a good frame rate, even the touch panel is a large scale touch panel. A data transmission method transmits only the non-zero sensed values to a second integrated circuit where a calculation with the non-zero sensed values is executed, and thereby reduces the data transmission time.

5 Claims, 5 Drawing Sheets

(56) References Cited

U.S. PATENT DOCUMENTS

| | | | |
|---|---|---|---|
| 2009/0083589 A1* | 3/2009 | Fulton et al. | 714/48 |
| 2009/0102814 A1* | 4/2009 | Lin et al. | 345/174 |
| 2009/0160787 A1* | 6/2009 | Westerman et al. | 345/173 |
| 2009/0251427 A1* | 10/2009 | Hung et al. | 345/173 |
| 2009/0251428 A1* | 10/2009 | Hung et al. | 345/173 |
| 2009/0251429 A1* | 10/2009 | Hung et al. | 345/173 |
| 2009/0251430 A1* | 10/2009 | Hung et al. | 345/173 |
| 2009/0284494 A1* | 11/2009 | Hung et al. | 345/174 |

\* cited by examiner

CAPACITIVE TOUCH SYSTEM AND DATA TRANSMISSION METHOD IN A CAPACITIVE TOUCH SYSTEM

FIELD OF THE INVENTION

The present invention is related generally to a capacitive touch system and, more particularly, to a data transmission method in a capacitive touch system.

BACKGROUND OF THE INVENTION

In conventional applications, all the large scale capacitive touch panels use a surface capacitance sensing technique to scan thereto for determining a touch information, which uses a set of sensing currents, each directed to an endpoint of the large scale touch panel to produce sensed values, and therefore, even multiple fingers simultaneously touch the large scale touch panel, this sensing technique still retrieves only one set of sensed currents in response to this multi-finger touch. For this reason, the surface capacitance sensing technique can identify only one set of absolute coordinates. In a two dimensional matrix for instance, only one set of parameters (X,Y) will be determined, and thereby it can't implement a multi-finger touch detection.

An all points addressable (APA) projected capacitance sensing technique is capable of implementing a multi-finger touch detection, but not applicable to large scale touch panels because, to implement this sensing technique, it is necessary to charge and discharge each point sensor on the large scale touch panel. Taking a matrix-type touch panel for example, when the X and Y traces increase, the pixel number of an APA projected capacitance touch panel dramatically increases and thereby significantly degrades the frame rate of the touch panel due to the very long time period for scanning the large scale touch panel in a frame.

An axis intersect (AI) projected capacitance sensing technique is also capable of implementing a multi-finger touch detection, but not applicable to large scale touch panels, too. FIG. 1 is a schematic diagram of a conventional AI projected capacitance sensing technique applied to a small scale touch panel 10, in which an AI projected capacitance touch IC 12 is used to scan the small scale touch panel 10. Assuming that the AI projected capacitance touch IC 12 can support up to 22 traces, a good frame rate can be attained for a small scale touch panel 10 having ten X traces TRX1-TRX10 and ten Y traces TRY1-TRY10. However, if a this type touch IC 12 is applied to a large scale touch panel 14 having forty X traces TRX1-TRX40 and forty Y traces TRY1-TRY40, as shown in FIG. 2, the total number of traces that the touch IC 12 needs to scan dramatically increases. Unfortunately, the frame rate of the overall touch panel application is dependent to a very large extent on the time it takes the touch IC 12 to charge and discharge capacitors each time. In other words, the frame rate is determined mainly by the time in a frame that the touch IC 12 charges and discharges the capacitors. Hence, if an AI projected capacitance touch IC capable of scanning a greater number of traces is applied to a large scale touch panel 14, a major drawback would be a significantly decreased frame rate in the overall application, which leads to compromised performance at the application end.

SUMMARY OF THE INVENTION

An object of the present invention is to provide a capacitive touch system and a data transmission method in a capacitive touch system.

According to the present invention, a capacitive touch system includes a touch panel having a plurality of traces connected to at least two first integrated circuits, and a second integrated circuit connected to the first integrated circuits. Each of the first integrated circuits is responsible for scanning a respective portion of the traces and sends the non-zero sensed values to the second integrated circuit where a calculation with the non-zero sensed values is executed. According to the present invention, a data transmission method for this capacitive touch system includes sending the order numbers of a first and a last traces that have non-zero sensed values, and the sensed values of all those traces whose order numbers range from the order number of the first trace having a non-zero sensed value to the order number of the last trace having a non-zero sensed value, to the second integrated circuit. The sensed values sent from the first integrated circuits to the second integrated circuit are packaged with a data structure including a first field for the order numbers of the first and last traces having non-zero sensed values, and a second field following the first field for the sensed values of all the traces whose order numbers range from the order number of the first trace having a non-zero sensed value to the order number of the last trace having a non-zero sensed value.

Since only the non-zero sensed values are transmitted from the first integrated circuits to the second integrated circuit, the transmission time for the sensed values can be significantly reduced and thereby a higher overall frame rate can be achieved.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
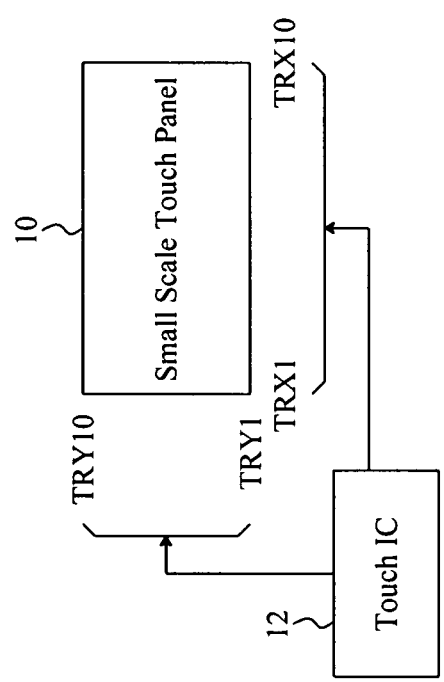
FIG. 1 is a schematic diagram of a conventional AI projected capacitance sensing technique applied to a small scale touch panel.
Figure 2:
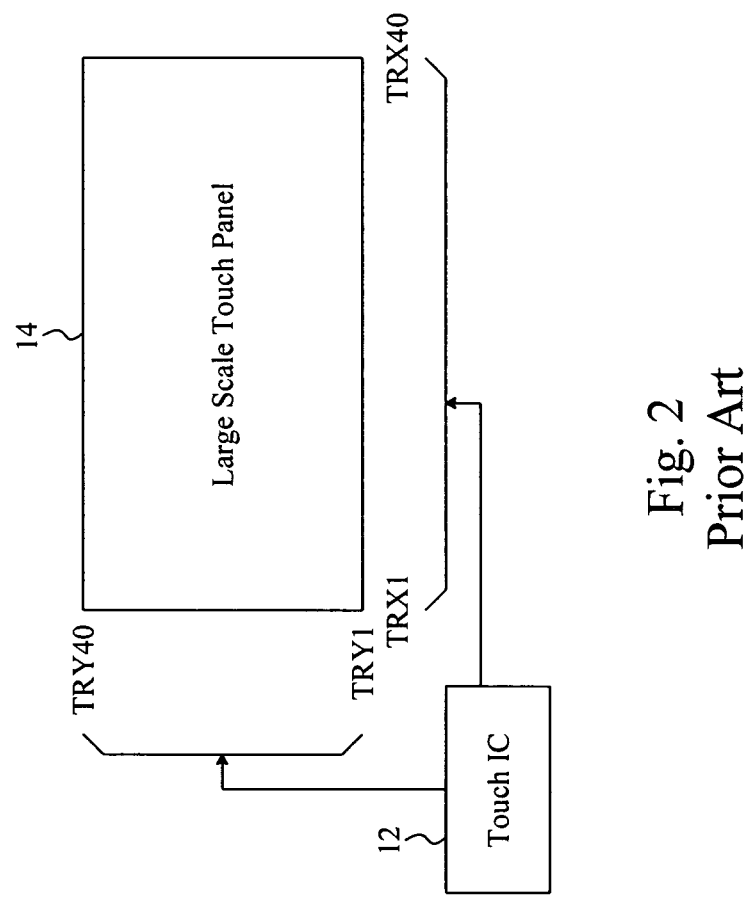
FIG. 2 is a schematic diagram of a conventional AI projected capacitance sensing technique applied to a large scale touch panel.
Figure 3:
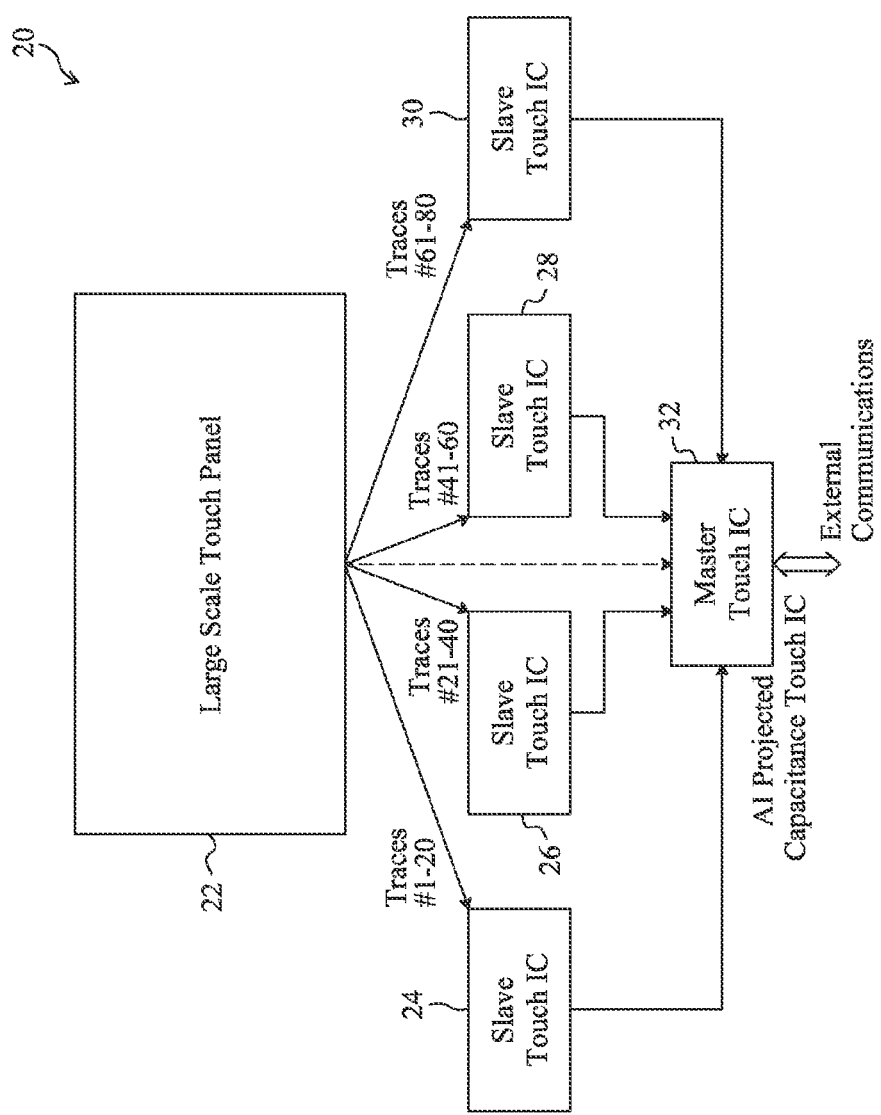
FIG. 3 is a schematic diagram of a capacitive touch system using at least two AI projected capacitance touch ICs to scan a touch panel.

According to the present invention, as shown in FIG. 3, a capacitive touch system 20 uses four AI projected capacitance touch ICs 24, 26, 28 and 30 to simultaneously scan a large scale touch panel 22 to increase the frame rate of the capacitive touch system 20. Assuming that the large scale touch panel 22 has eighty traces, for example, given the order numbers of 1-80, each of the touch ICs 24-30 is responsible for scanning respective twenty traces. Each of the touch ICs 24-30 is a slave touch IC, scans the traces in one or more directions, and transmits its sensed values to a master touch IC 32 where the received sensed values are used for final and overall calculation, and subsequent actions may be determined for intended applications. The master touch IC 32 is also responsible for coordinating the overall operation of the capacitive touch system 20 and external communications. If needed, the master touch IC 32 may also take part in scanning, as indicated by the dashed line in FIG. 3. Alternatively, the slave touch ICs 24-30 may share some calculation to reduce the loading of the master touch IC 32.

In the capacitive touch system 20, each of the slave touch ICs 24-30 scans twenty traces. If the sensed value of each trace is transmitted to the master touch IC 32, then each of the slave touch ICs 24-30 will need to transmit twenty sensed values in each frame, and it will take a lot of time for this data transmission. Actually, the touch area on the large scale touch panel 22 is very small compared with the entire area of the large scale touch panel 22. In other words, most of the traces will have zero sensed values, even in a multi-finger touch. Therefore, if only non-zero sensed values are transmitted from the slave touch ICs 24-30 to the master touch IC 32, the transmission time will be significantly reduced.

Figure 4:
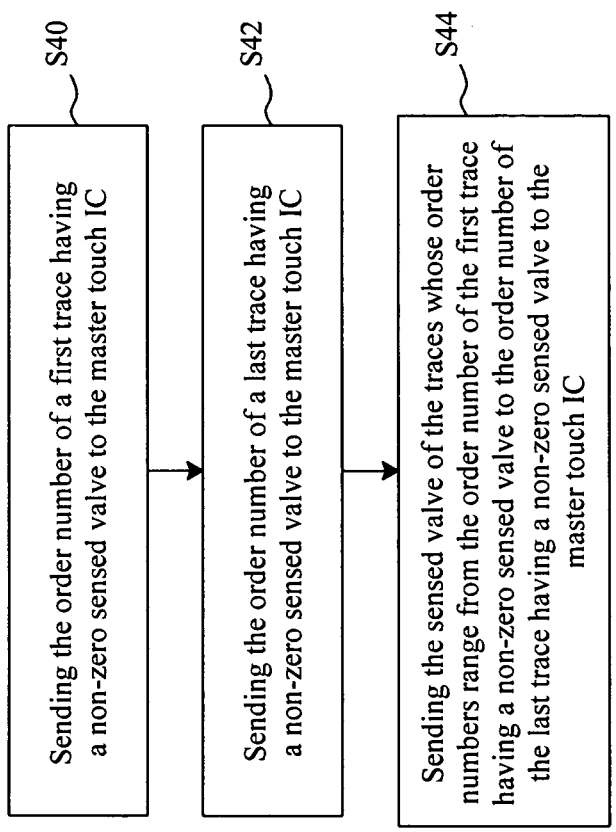
FIG. 4 is a diagram showing a flowchart of a data transmission method in a capacitive touch system according to the present invention.
Figure 5:
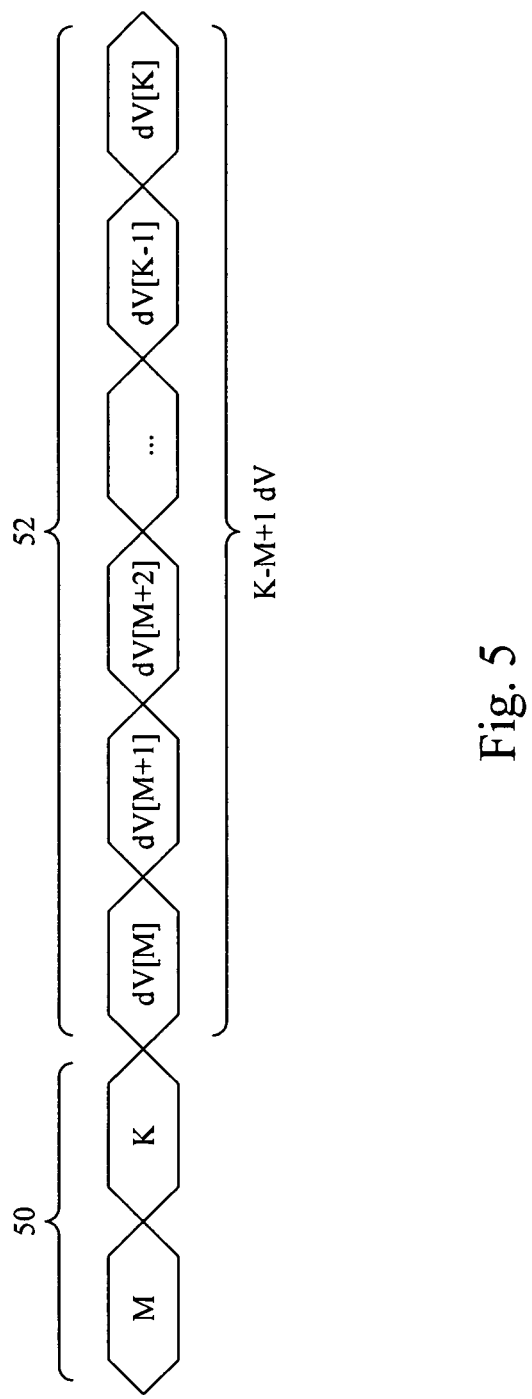
FIG. 5 is a diagram showing a data structure for a data transmission method in a capacitive touch system according to the present invention.

According to the present invention, FIG. 4 is a diagram showing a flowchart of a data transmission method in the capacitive touch system 20, and FIG. 5 is a diagram showing a data structure for this data transmission method. As shown in FIG. 4, the slave touch IC 24 transmits its sensed values to the master touch IC 32 in such a manner that step S40 sends the order number M of a first trace having a non-zero sensed value to the master touch IC 32, step S42 sends the order number K of a last trace having a non-zero sensed value to the master touch IC 32, and step S44 sends the sensed values dV[M], dV[M+1], dV[M+2], . . . , dV[K−1] and dV[K] of those traces whose order numbers range from the order number M to the order number K to the master touch IC 32. As shown in FIG. 5, the sensed values sent by the slave touch IC 24 are packaged with a data structure including a first field 50 for notifying the master touch IC 32 that the order number M of the first trace having a non-zero sensed value and the order number K of the last trace having a non-zero sensed value, and a second field 52 following the first field 50 for being embedded with the sensed values dV[M], dV[M+1], dV[M+2], . . . , dV[K−1] and dV[K] of the traces whose order numbers range from the order number M to the order number K. If the user's finger is not within the scanning zone of the slave touch IC 24, all the sensed values obtained by the slave touch IC 24 will be zero. In this case, the order number M of the first trace having a non-zero sensed value and the order number K of the last trace having a non-zero sensed value are both equal to a default value, which informs the master touch IC 32 that all the sensed values detected by the slave touch IC 24 are zero and can be skipped, so that the master touch IC 32 moves on to read the sensed values of the next slave touch IC 26, thereby increasing the overall frame rate of the capacitive touch system 20.

All the other slave touch ICs 26-30 operate in the same way as described above. The sensing method according to the present invention may provide detailed information in applications where sensed values are to be further used or sensed values of consecutive frames are to be compared.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A data transmission method in a capacitive touch system, comprising:
using at least two first integrated circuits defining slave integrated circuits to simultaneously scan a touch panel, each of the first integrated circuits for scanning a respective portion of a plurality of traces of the touch panel to determine a plurality of scanned sensed values, the data transmission method comprising:
for each of the first integrated circuits, determining a touch area from the plurality of scanned sensed values including a plurality of traces having non-zero sensed touch values defining a touch position, each of the plurality of traces having non-zero sensed touch values being given an order number and sending the order number of a first trace of the plurality of traces having a non-zero sensed touch value and the order number of a last trace of the plurality of traces having a non-zero sensed touch value to a second integrated circuit defining a master integrated circuit; and
sending the sensed touch values of all traces whose order numbers range from the order number of the first trace having a non-zero sensed touch value and the order number of the last trace having a non-zero sensed touch value to the second integrated circuit.

2. A capacitive touch system, comprising:
a touch panel having a plurality of traces;
at least two first integrated circuits defining slave integrated circuits, each connected to a respective portion of the traces, the two first integrated circuits simultaneously scanning thereto to determine a plurality of scanned sensed values; and
a second integrated circuit defining a master integrated circuit connected to each of the first integrated circuits, receiving non-zero sensed touch values of the traces defining a touch position from the plurality of scanned sensed values from the first integrated circuits and calculating therewith, each of the non-zero sensed touch values being given an order number;
wherein the received non-zero sensed touch values are packaged with a data structure including:
a first field for the order number of a first trace having a non-zero sensed touch value and the order number of the last trace having a non-zero sensed touch value; and
a second field following the first field for the sensed touch values of all the traces whose order number range from the order number of the first trace having a non-zero sensed touch value and the order number of the last trace having a non-zero sensed value.

3. The capacitive touch system of claim 2, wherein the second integrated circuit coordinates the overall operation of the capacitive touch system.

4. The capacitive touch system of claim 2, wherein the second integrated circuit is responsible for external communications.

5. The capacitive touch system of claim 2, wherein the second integrated circuit comprises an axes-intersecting projected capacitance touch integrated circuit.

* * * * *